United States Patent
Farres et al.

(10) Patent No.: US 12,097,829 B2
(45) Date of Patent: Sep. 24, 2024

(54) PNEUMATIC ANTI-COMPOUND ON SERVICE BRAKE BACKUP LINE

(71) Applicant: Volvo Truck Corporation, Gothenburg (SE)

(72) Inventors: Lionel Farres, Heyrieux (FR); Jean-Sébastien Tillet, Dagneux (FR)

(73) Assignee: Volvo Truck Corporation, Gothenburg (SE)

( * ) Notice: Subject to any disclaimer, the term of this patent is extended or adjusted under 35 U.S.C. 154(b) by 394 days.

(21) Appl. No.: 17/590,043

(22) Filed: Feb. 1, 2022

(65) Prior Publication Data
US 2022/0250598 A1    Aug. 11, 2022

(30) Foreign Application Priority Data
Feb. 10, 2021   (EP)  .................................... 21156432

(51) Int. Cl.
*B60T 13/68*        (2006.01)
*B60T 7/04*         (2006.01)
(Continued)

(52) U.S. Cl.
CPC ............ *B60T 13/683* (2013.01); *B60T 7/042* (2013.01); *B60T 13/261* (2013.01); *B60T 17/083* (2013.01)

(58) Field of Classification Search
CPC ...... B60T 13/26; B60T 13/261; B60T 13/263; B60T 13/38; B60T 13/36; B60T 13/385; B60T 13/683; B60T 7/042; B60T 17/073
See application file for complete search history.

(56) References Cited

U.S. PATENT DOCUMENTS

| | | | | |
|---|---|---|---|---|
| 5,458,403 A | * | 10/1995 | Moody | B60T 13/265 303/7 |
| 5,553,928 A | * | 9/1996 | Hart | B60T 13/265 303/7 |

(Continued)

FOREIGN PATENT DOCUMENTS

| | | |
|---|---|---|
| CN | 103534152 A | 1/2014 |
| CN | 106458191 A | 2/2017 |

(Continued)

OTHER PUBLICATIONS

First Office Action for Chinese Patent Application No. 202210111417.X mailed Dec. 9, 2023, 12 pages.
(Continued)

*Primary Examiner* — Thomas J Williams
(74) *Attorney, Agent, or Firm* — Withrow & Terranova, PLLC

(57) ABSTRACT

The disclosure relates to a pneumatic braking system comprising a service brake actuator; an electro-pneumatic modulator unit for receiving an air control pressure representative of a driver's braking request; delivering, by a regulation unit, a modulated air pressure to a service brake chamber; a parking brake actuator; a parking brake unit for delivering a second air pressure to a parking brake pneumatic chamber; and an isolation device for when the isolation device is electrically energized, preventing the delivery of the air control pressure to the regulation unit, and for when the isolation device is not electrically energized, allowing the delivery of air control pressure to the regulation unit when the second air pressure is higher than a threshold, and preventing the delivery of air control pressure to the regulation unit when the second air pressure is lower than the threshold.

14 Claims, 10 Drawing Sheets

(51) Int. Cl.
*B60T 13/26* (2006.01)
*B60T 17/08* (2006.01)

(56) References Cited

U.S. PATENT DOCUMENTS

| | | | | |
|---|---|---|---|---|
| 6,312,060 | B1* | 11/2001 | Lipscomb | B60T 13/683 |
| | | | | 188/170 |
| 8,944,525 | B2* | 2/2015 | Mederer | B60T 15/027 |
| | | | | 303/3 |
| 2010/0106385 | A1* | 4/2010 | Ramler | B60T 13/265 |
| | | | | 303/11 |
| 2016/0375884 | A1 | 12/2016 | Farres et al. | |
| 2018/0273004 | A1* | 9/2018 | Niglas | B60T 13/662 |
| 2019/0337502 | A1* | 11/2019 | Farres | B60T 15/027 |
| 2022/0250598 | A1* | 8/2022 | Farres | B60T 17/083 |

FOREIGN PATENT DOCUMENTS

| | | |
|---|---|---|
| CN | 111278699 A | 6/2020 |
| CN | 112055675 A | 12/2020 |
| WO | 9106458 A1 | 5/1991 |
| WO | 2015092470 A1 | 6/2015 |
| WO | 2020228963 A1 | 11/2020 |

OTHER PUBLICATIONS

Extended European Search Report for European Patent Application No. 21156432.3, mailed Sep. 9, 2021, 5 pages.

* cited by examiner

PNEUMATIC ANTI-COMPOUND ON SERVICE BRAKE BACKUP LINE

RELATED APPLICATIONS

The present application claims priority to European Patent Application No. 21156432.3, filed on Feb. 10, 2021, and entitled "PNEUMATIC BRAKING SYSTEM FOR AN AXLE OF A VEHICLE," which is incorporated herein by reference in its entirety.

TECHNICAL FIELD

This disclosure relates to vehicle braking systems with a compound management function. It relates in particular to electronically control pneumatic braking systems for heavy duty vehicles like trucks, buses, off-highway vehicles.

BACKGROUND ART

It is known to provide electronic anti-compounding function. Such function is disclosed for example in application WO 2020/228963 Electronic anti-compounding function operates when vehicle is operated in regular conditions, which means when all electronic systems are electrically powered-up, and without any electrical fault present in the braking system.

When electrical systems are switched-off, or not electrically powered, electronic anti-compounding function is not active. In such a case, anti-compounding function has to be provided in a different way.

A goal of the present invention is to provide a solution in which anti-compounding function is performed throughout the use cases of the vehicle. In particular, anti-compounding should be available even when electronic systems are not powered-up.

At the same time, proposed solution should allow electronic anti-compounding function to still be active when electronic systems are used in nominal mode, which is powered-up and with no fault present.

Proposed solution is based on a new concept of isolation valve provided on the pneumatic back-up line of the braking system.

SUMMARY

It is proposed a pneumatic braking system for an axle of a vehicle, comprising:
a. a service brake actuator configured for applying a braking force to an axle of the vehicle,
b. an electro pneumatic modulator unit configured for:
  i. Receiving a first air control pressure representative of a vehicle driver's braking request,
  ii. Receiving an air supply pressure, and
  iii. Delivering a first modulated air pressure to a service brake chamber to control the braking force applied by the service brake actuator, the first modulated air pressure being delivered by a regulation unit,
c. a parking brake actuator, configured for applying a braking force under the action of an elastic spring and of a pneumatic chamber, the pneumatic chamber being configured for applying a force opposed to the force applied by the spring,
a total braking force being the sum of service brake actuator force and parking brake actuator force, the pneumatic braking system further comprising:
d. a parking brake unit, configured for delivering a second air pressure to the parking brake pneumatic chamber to control the braking force applied by the parking brake actuator,
e. an isolation device configured for:
  i. in a first mode in which the isolation device is electrically energized, preventing the delivery of the first air control pressure to the regulation unit, and
  ii. in a second mode in which the isolation device is not electrically energized:
    1. allowing the delivery of the first air control pressure to the regulation unit so that a braking force is applied by the service brake actuator when the pressure in the parking brake chamber is higher than a first predetermined threshold, and
    2. preventing the delivery of the first air control pressure to the regulation unit when the pressure in the parking brake chamber is lower than or equal to the first predetermined threshold.

Thanks to the features of the isolation device, the first air control pressure is delivered to the regulation unit only when the pressure in the parking brake chamber is high enough, i.e higher than a first predetermined threshold. This high pressure in the parking brake chamber can exist only if the parking brake is released. In other words, service brakes can be activated only if parking brake is released. Anti-compounding function is achieved without any need to have the electronic systems energized. This gives the advantage that even in particular use cases during which some electronic systems of the truck are disconnected, like for example during vehicle servicing in a workshop, service brakes can only be applied by a mechanic while parking brake is already released. Reliability issues associated with brake compounding are avoided.

According to one aspect of the disclosure, when the isolation device is electrically energized, the electro pneumatic modulator unit is configured for delivering a first modulated air pressure to the service brake chamber, the first modulated air pressure being controlled only by the regulation unit in response to electrical control signals.

According to one aspect, the electrical control signals are sent by an ecu braking system.

The following features, can be optionally implemented, separately or in combination one with the others:

According to an embodiment of the pneumatic braking system, the isolation device comprises an on-off solenoid valve, the on-off solenoid valve comprising:
a.—an inlet port,
b.—an outlet port,
c—a control port,
d—a return spring,
e—an electromagnet,
f—a plunger, configured for moving under the joined action of the electromagnet, of the return spring and of a pressure in the control port, to selectively allow or prevent fluidic communication between the inlet port and the outlet port,
the plunger being configured for:
  i. allowing fluidic communication between the inlet port and the outlet port when the electromagnet is not electrically energized and the pressure in the control port is higher than the first predetermined threshold, and ii. preventing fluidic communication between inlet port and outlet port:
  1. when the electromagnet is electrically energized or
  2. when the electromagnet is not electrically energized and the pressure in the inlet port is higher than a second predetermined threshold and the pressure in the control port is lower than a third predetermined threshold,
in which the first air control pressure is fluidically connected to the inlet port of the on-off solenoid valve, in which the outlet port of the on-off solenoid valve is fluidically connected to the regulation unit, and in which the control port is fluidically connected to the parking brake pneumatic chamber.

According to another embodiment of the pneumatic braking system, the isolation device comprises a select low valve and an electromagnetic isolation valve,
  a. the electromagnetic isolation valve comprising an inlet port and an outlet port, and being configured for allowing fluidic communication between the inlet port and the outlet port when the electromagnetic isolation valve is not electrically energized and for preventing fluidic communication between the inlet port and the outlet port when the electromagnetic isolation valve is electrically energized,
  b. the select low valve comprising a first inlet port connected to the first air control pressure, a second inlet port connected to the parking brake pneumatic chamber having a second air pressure, and an outlet port,
  the select low valve being configured so that an outlet port pressure is equal to the lowest of the first pressure and second air pressure,
  the outlet port of the select low valve is connected to the inlet port of the electromagnetic isolation valve,
  and the outlet port of the electromagnetic isolation valve is configured for being in fluidic communication with the regulation unit.

According to another embodiment of the pneumatic braking system, the isolation device comprises a pneumatic isolation valve and an electromagnetic isolation valve,
  a. the pneumatic isolation valve comprising a control port, an inlet port, an outlet port, the first air control pressure being fluidically connected to the inlet port, the control port being fluidically connected to the parking brake pneumatic chamber,
  the pneumatic isolation valve being configured for:
    i. allowing fluidic communication between the inlet port and the outlet port if pressure in the control port is higher than the first predetermined threshold, and
    ii. preventing fluidic communication between the inlet port and the outlet port if pressure in the control port is lower than or equal to the first predetermined threshold, and
    iii. allowing fluidic communication between the outlet port and atmosphere if pressure in the control port is lower than or equal to the first predetermined threshold,
  b. the electromagnetic isolation valve comprising an inlet port and an outlet port, and being configured for:
    i. allowing fluidic communication between the inlet port and the outlet port when the electromagnetic isolation valve is not electrically energized and,
    ii. preventing fluidic communication between inlet port and outlet port when the electromagnetic isolation valve is electrically energized,
  in which the outlet port of the pneumatic isolation valve is connected to the inlet port of the electromagnetic isolation valve, and
  in which the outlet port of the electromagnetic isolation valve is configured for being in fluidic communication with the regulation unit.

According to one embodiment, the isolation device is included in the electro pneumatic modulator unit.

According to another embodiment, the isolation device is included in a foot brake modulator, the foot brake modulator being configured for delivering the first air control pressure and being a separated unit from the electro pneumatic modulator unit.

According to yet another embodiment, the isolation device is separated from electro pneumatic modulator unit and separated from the foot brake modulator.

According to one aspect of the pneumatic braking system, the parking brake chamber pressure first threshold for allowing or preventing the delivery of the first air control pressure to the regulation unit is comprised between 3.5 Bar and 4.5 Bar.

According to one aspect, the second predetermined threshold is comprised between 3 and 4 Bar, and the third predetermined threshold is comprised between 2 and 2.8 Bar.

According of one example of implementation of the pneumatic braking system, the parking brake unit comprises an electronic control unit configured for delivering the second modulated air pressure to the parking brake pneumatic chamber.

According of one example of implementation, the pneumatic braking system further comprises:
  a.—a second service brake actuator configured for applying a braking force to a second axle of the vehicle,
  b.—a second electro pneumatic modulator unit configured for:
    i. Receiving the first air control pressure representative of a vehicle driver's braking request,
    ii. Receiving the air supply pressure, and
    iii. Delivering a second modulated air pressure to a second service brake chamber to control the braking force applied by the second service brake actuator, the second modulated air pressure being delivered by a second regulation unit,
  in which the isolation device is further configured for:
    in a first mode in which the isolation device is electrically energized, preventing the delivery of the first air control pressure to the second regulation unit,
    in a second mode in which the isolation device is not electrically energized:
      allowing the delivery of the first air control pressure to the second regulation unit when the pressure in the parking brake chamber is higher than a first predetermined threshold, and
      preventing the delivery of the first air control pressure to the second regulation unit when the pressure in the parking brake chamber is lower than or equal to the first predetermined threshold.

According to an embodiment, the isolation device is included in the electro pneumatic modulator unit.

The invention also relates to a braking system assembly, comprising:
  a. a first pneumatic braking system as previously described, the first pneumatic braking system cooperating with a first axle of the vehicle, and comprising b. a second pneumatic braking system as previously described, the second pneumatic braking system cooperating with a second axle of the vehicle, the first pneumatic braking system comprising a foot brake modulator comprising two stages, the first stage being configured to deliver a first air control pressure representative of a vehicle driver's braking request to the isolation device of the first pneumatic braking system, and the second stage being configured to deliver the first air control pressure representative of a vehicle driver's braking request to the isolation device of the second pneumatic braking system.

The invention relates as well to a commercial vehicle comprising a pneumatic braking system as previously described or comprising a braking system assembly as previously described.

BRIEF DESCRIPTION OF DRAWINGS

Other features, details and advantages of the invention will appear from the following detailed description of three of its embodiments, given by way of non-limiting example, and with reference to the accompanying drawings, in which.

DESCRIPTION OF EMBODIMENTS

Figure 14:
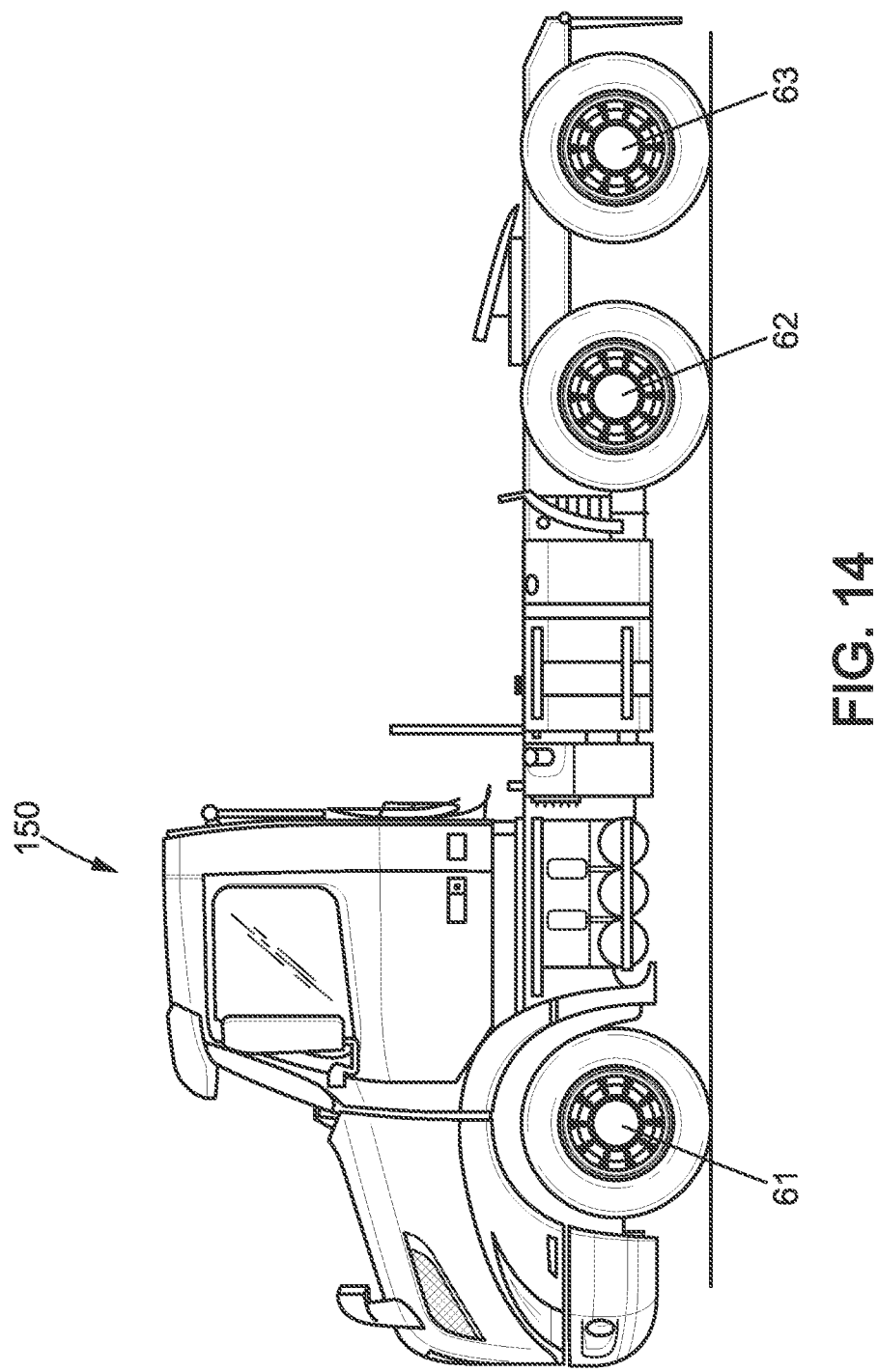
FIG. 14 is a general view of a truck with a pneumatic braking system according to the disclosure.

FIG. 14 illustrates in a non-limiting manner a truck 150 with three axles, a front steering axle 61 and two rear axles 62 and 63. The truck 150 comprises a pneumatic braking system 100.

The truck considered here can be the tractor unit in a tractor/trailer configuration. It can also be a utility 'carrier' truck. The proposed configuration is also valid for any kind of heavy-duty vehicles, including buses and construction vehicles.

Figure 1:
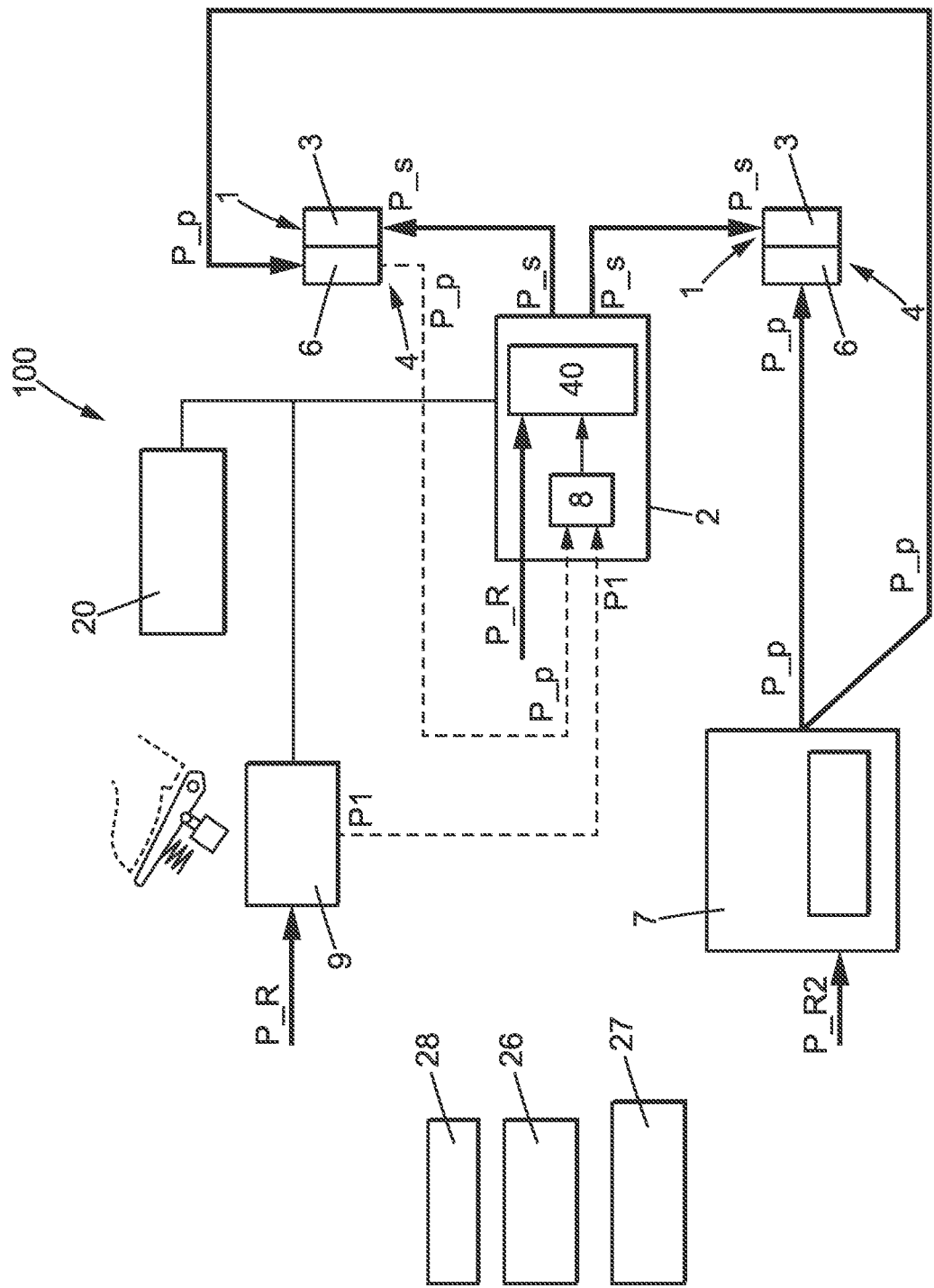
FIG. 1 is a schematic view of the general architecture of a pneumatic braking system according to an embodiment of the invention.

FIG. 1 is a schematic of the layout of the braking system 100. Only the most relevant components have been represented. Plain lines represent pneumatic lines supplying delivery pressure to the various air brakes actuators. Dotted lines represent pneumatic lines supplying control pressure to the devices that control the operation of the brake actuators.

Braking system 100 comprises a central braking electronic control unit 20. This central braking unit manages the operation of the braking system 100. It includes an electro pneumatic modulator 2, a foot brake modulator 9, a parking brake unit 7, one or several service brake actuators 1, one or several parking brake actuators 4. The braking system 100 of the truck comprises a service brake and a parking brake.

The service brake is configured to apply a braking effort on an axle of the vehicle when the vehicle is rolling. The service brake is controlled by the driver by his foot pressure on a brake pedal. The parking brake is configured to apply a braking effort on an axle of the vehicle when the vehicle is parked.

Vehicle driver's braking request is delivered by a foot brake modulator 9. Foot brake modulator 9 delivers a first air control pressure P1 that increases when the drivers increases his effort on the brake pedal of the vehicle.

The electro pneumatic modulator 2 receives an air supply pressure P_R and delivers a modulated air pressure P_s to the service brake actuators 1. Electro pneumatic modulator unit 2 is configured to control wheel speed deceleration. It therefore ensures wheels anti-lock function and is part of the stability control function of the vehicle. Electro pneumatic modulator unit 2 is configured to receive braking requests from the central electronic control unit 20. In this example, electro pneumatic modulator unit 2 is configured to communicate with central electronic control unit 20 by digital communication protocol. CAN protocol can for example be implemented. The various electronic systems are connected to an electrical harness. Electrical power is provided by a battery which is charged by an alternator for trucks with internal combustion engines.

The air supply pressure P_R is provided by a service brake reservoir 26. Service brake reservoir 26 is supplied in compressed air by an air compressor 28 which compresses atmospheric air and increases its pressure above atmospheric pressure. Pressure in the service brake reservoir 26 is controlled by a regulation unit which has not been represented, so called governor. Nominal reservoir pressure is for example 8 bar.

In the illustrated example, the parking brake unit 7 is configured for receiving a second supply air pressure P_R2. Second supply air pressure is delivered by a second air reservoir which is parking brake reservoir 27.

Driver's service braking requests are interpreted by the system from the position of the brake pedal in the foot brake modulator 2. Brake pedal position is monitored by redundant position sensors. The pedal position information is used by the central braking ecu to control the various actuators in order to achieve the driver request. Other systems like anti-locking or stability control may override driver's request.

In parallel of the electrical signal, a first air control pressure P1, representative of a vehicle driver's braking request, is delivered by a foot brake modulator 9. First air control pressure P1 increases when a depression applied by the vehicle driver on the brake pedal increases.

The parking brake is configured to have only two stable operation modes: a first mode in which the parking brake is released, a second mode in which the parking brake is activated with nominal braking force. The parking brake can be activated or released by the driver by pulling a lever, or knob.

Figure 10:
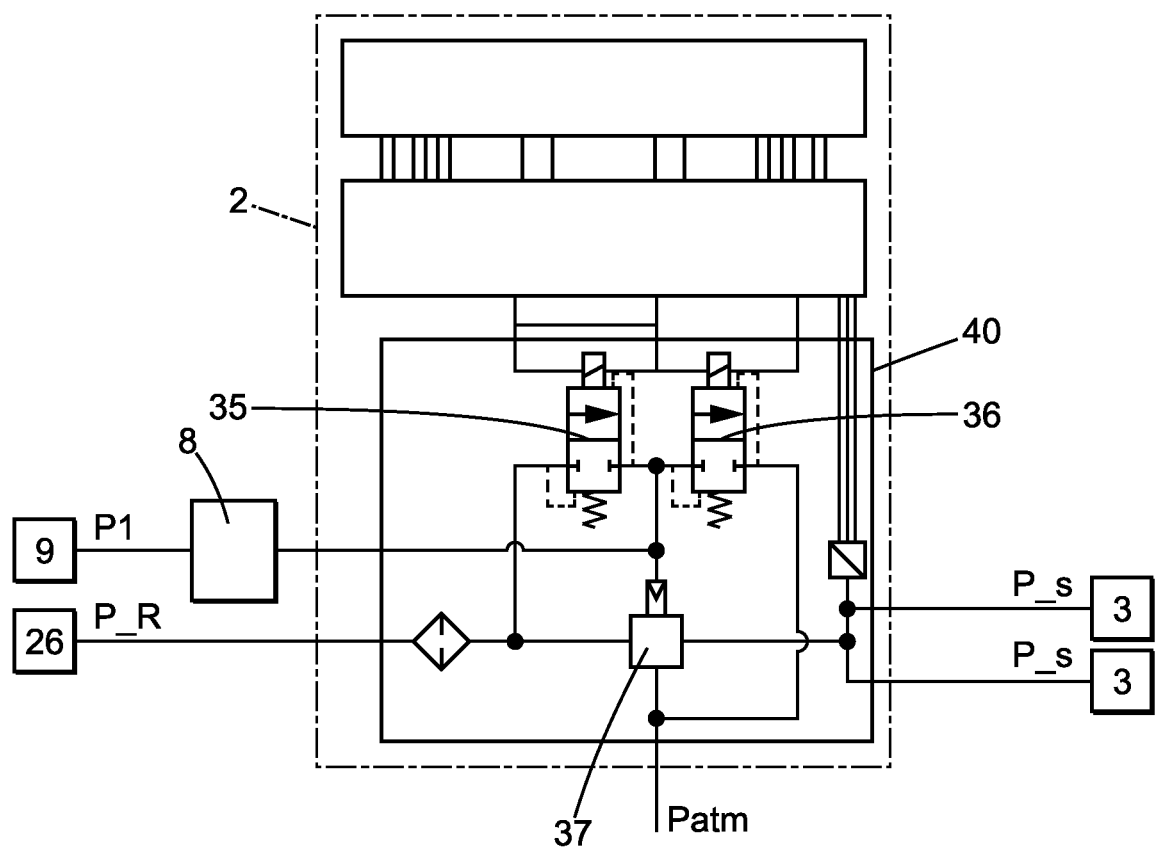
FIG. 10 is another schematic view of a detail of the pneumatic braking system.

FIG. 10 describes schematically the electro pneumatic modulator 2.

The modulated air pressure P_s is obtained by modulation of the air supply pressure P_R and atmospheric pressure. In other words, modulated air pressure P_s is inferior or equal to air supply pressure P_R. For this, the electro pneumatic modulator 2 comprises a relay valve 37 and two electrovalves 35, 36. The detailed operation of the regulation unit is known and will not be extensively described. In summary, when the electronic control is active, the two electrovalves 35 and 36 can adjust the outlet pressure P_s which is supplied to the service brake chambers 3. This pressure can be continuously adjusted between the supply pressure P_R and the atmospheric pressure Patm. Pulse width modulation control of the two electrovalves 35, 36 achieves a closed loop control of the pressure delivered to the service brake.

In case electronic control is not active, either because of a fault in the system or because not all the elements of the system have been assembled, electrovalves 35 and 36 are not electrically powered-up and remain in shut-off position. Relay valve 37 receives the first air control pressure P1. P1 pressure may control the relay valve so that the supply pressure P_R is delivered to the service brake chamber 3.

Figure 9:
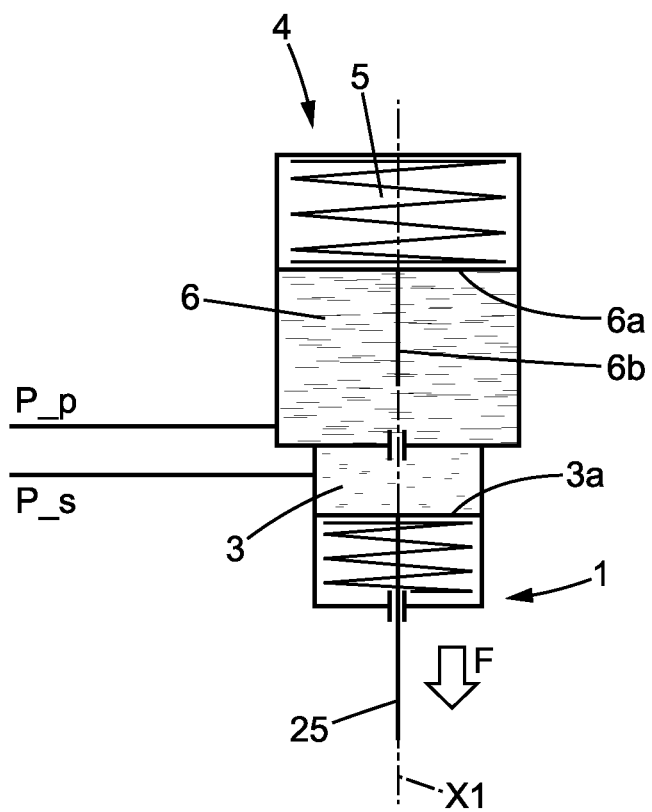
FIG. 9 is a schematic view of a braking actuator used by the pneumatic braking system.

FIG. 9 describes a brake actuator integrated in the pneumatic brake system 100.

The actuator has the general shape of a cylinder having an axis X1. This cylinder forms an enclosure having two chambers 3, 6 separated by a wall and a sealing member. An actuation rod 25 protudes from the housing. One chamber 3 is dedicated to the service brake and the second chamber 6 is dedicated to the parking brake.

The service brake chamber 3 has a first mobile piston 3a that can reciprocate in a first sealed cavity. The first piston 3a and the actuation rod 25 are rigidly connected together. Pressure applied in the service brake chamber 3 moves the first mobile piston 3a and the actuation rod 25 in a first direction. The actuation rod 25 in turn activates a mechanism, not represented, that pushes the brake shoes against the brake drums, or that pushes brake pads against brake disk. Braking force is thus generated on the axle.

The parking brake chamber 6 has a second mobile piston 6a that can reciprocate in a second cavity sealed by a second mobile membrane. The first 3a and second 6a pistons are coaxial. An internal rod 6b is rigidly connected to the second piston 6a. A preloaded spring 5 is compressed between the housing and the second mobile piston 6a. Preloaded spring 5 tends to push the second piston 6a in the first direction, against the first piston 3a. Pressure applied in the parking brake chamber 6 pushes back the second piston 6a in the opposite direction. This pressure tends to compress the spring 5 and to move the second piston 6a apart from the first piston 3a and therefore to release the effort on the actuation rod 25.

When no pressure is applied in the parking brake chamber 6, the second piston 6a is pushed by the preloaded spring 5 and the internal rod 6b against the first piston 3a and push it. Consequently, the actuation rod 25 is pushed and braking effort is applied.

When pressure is applied in the parking brake chamber 6, the second piston is retracted and leaves the first piston 3a and the actuation rod 25 free to move under the action of the pressure in the service brake chamber 6.

In case pressure in the service brake chamber 3 is applied while parking brake is already activated, the efforts of the two mobile pistons 3a, 6a add to each other. Therefore, the actuation force on the rod 25 can become excessive for the brake shoe mechanism. This sequence is called brake compounding and is well known to be an issue for the reliability of the brakes. The main goal of the current disclosure is to propose a solution that can provide anti-compounding function in particular use cases that were not properly addressed by the prior art.

In the present disclosure, an electrical component or subsystem is said to be energized when it is supplied with electrical power.

The pneumatic braking system 100 for an axle of a vehicle, comprises:
 a. a service brake actuator 1 configured for applying a braking force to an axle of the vehicle,
 b. an electro pneumatic modulator unit 2 configured for:
  i. Receiving a first air control pressure P1 representative of a vehicle driver's braking request,
  ii. Receiving an air supply pressure P_R, and
  iii. Delivering a first modulated air pressure P_s to a service brake chamber 3 to control the braking force applied by the service brake actuator 1, the first modulated air pressure P_s being delivered by a regulation unit 40,
 c. a parking brake actuator 4, configured for applying a braking force under the action of an elastic spring 5 and of a pneumatic chamber 6, the pneumatic chamber being configured for applying a force opposed to the force applied by the spring 5,
a total braking force F being the sum of service brake actuator force and parking brake actuator force, the pneumatic braking system 100 further comprising:
 d. a parking brake unit 7, configured for delivering a second air pressure P_p to the parking brake pneumatic chamber 6 to control the braking force applied by the parking brake actuator 4,
 e. an isolation device 8 configured for:
  i. in a first mode in which the isolation device 8 is electrically energized, preventing the delivery of the first air control pressure P1 to the regulation unit 40, and
  ii. in a second mode in which the isolation device 8 is not electrically energized:
   1. allowing the delivery of the first air control pressure P1 to the regulation unit 40 so that a braking force is applied by the service brake actuator when the pressure in the parking brake chamber 6 is higher than a first predetermined threshold Th_1, and
   2. preventing the delivery of the first air control pressure P1 to the regulation unit 40 when the pressure in the parking brake chamber 6 is lower than or equal to the first predetermined threshold Th_1.

The braking force of the service brake is applied by the service brake actuator 1. The level of braking force delivered by the service brake is controlled by the pressure un service brake chamber 3. As illustrated on FIG. 9, the rod 25 acts on the brake calipers to generate braking force on the related wheel of the axle.

Thanks to the features of the isolation device 8, the first air control pressure is delivered to the regulation unit 40 only when the pressure P_p in the parking brake chamber 6 is high enough, i.e higher than a first predetermined threshold Th_1. This high pressure in the parking brake chamber 6 can exist only if the parking brake is released. In other words, service brakes can be activated only if parking brake is released. Anti-compounding function is achieved without any need to have the electronic systems energized. This gives the advantage that even in particular use cases during which some electronic systems of the truck are disconnected, like for example during vehicle servicing in a workshop. Service brakes service brakes can only be applied by a mechanic while parking brake is in the released state. Reliability issues associated with brake compounding are avoided.

Allowing the delivery of the first air control pressure P1 to the regulation unit 40 means that the first air control pressure P1 is received by a fluidic port of the regulation unit 40.

When the isolation device 8 is electrically energized, the electro pneumatic modulator unit 2 is configured for delivering a first modulated air pressure P_s to the service brake chamber 3, the first modulated air pressure P_s being controlled only by the regulation unit 40 in response to electrical control signals. The electrical control signals are sent by ecu braking system.

In the first operation mode in which the isolation device 8 is electrically energized, the delivery of the first air control pressure P1 to the regulation unit 40 is prevented. In other words, in this first mode, the first air control pressure P1 is isolated from the service brake chamber 3. First air control pressure P1 has thus no effect on the regulation unit 40, and therefore has no effect either on the service brake actuator 1. This mode is the normal mode when all electronic systems are operating in a nominal way, i.e a fully functional state in which there's no electrical fault found by the on-board diagnostic system.

In this first operation mode, the anti-compounding function is performed by the electronic anti-compounding control strategy. Pressure in the service brake chamber 3 is managed by the pressure regulation device 40. The regulation unit 40 receives in this case an air pressure supply coming directly from the service brake reservoir 26. Regulation unit 40 comprises two electrovalves 35, 36 and a relay valve 37. Each valve can be selectively opened or closed, so that the pressure P_s delivered by the regulation unit 40 to the service brake chamber 3 can be adjusted to a set-point value. The pressure set-point value is provided by the central braking ecu. Set-point value depends on driver's request and actual wheel deceleration, so that wheel anti-lock function is active.

In the second operation mode, electronic anti-compounding control strategy is not relied upon, and anti-compounding function is provided by the back-up pneumatic line, using first air control pressure P1.

Three different embodiments of the general concept will be described.

Figure 2:
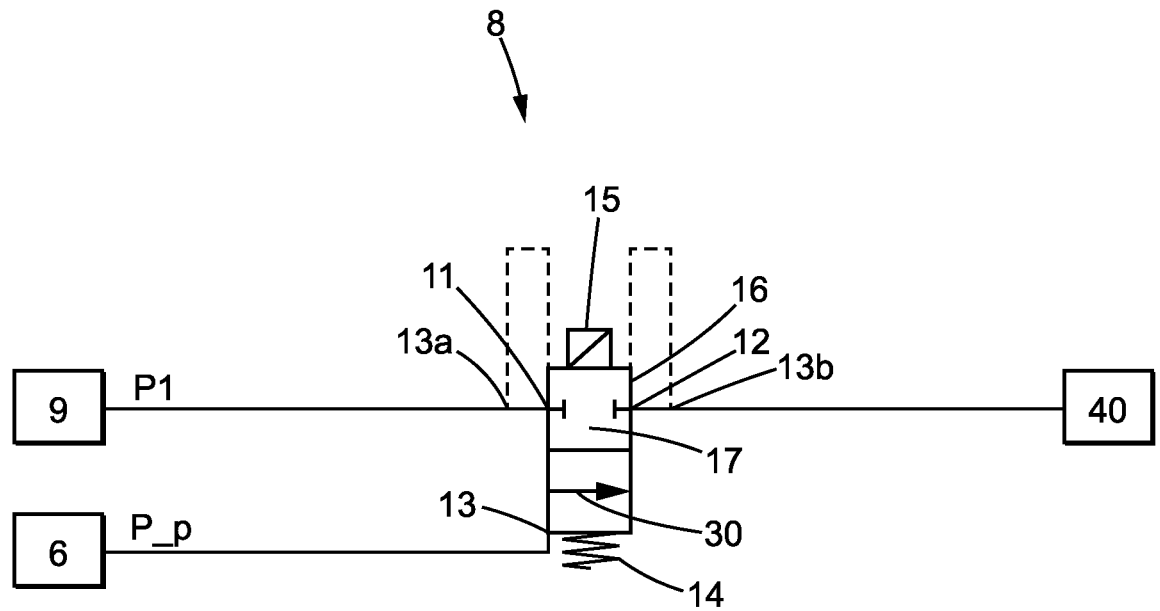
FIG. 2 is a schematic view of a first embodiment of an isolation device, in a first operating mode.
Figure 3:
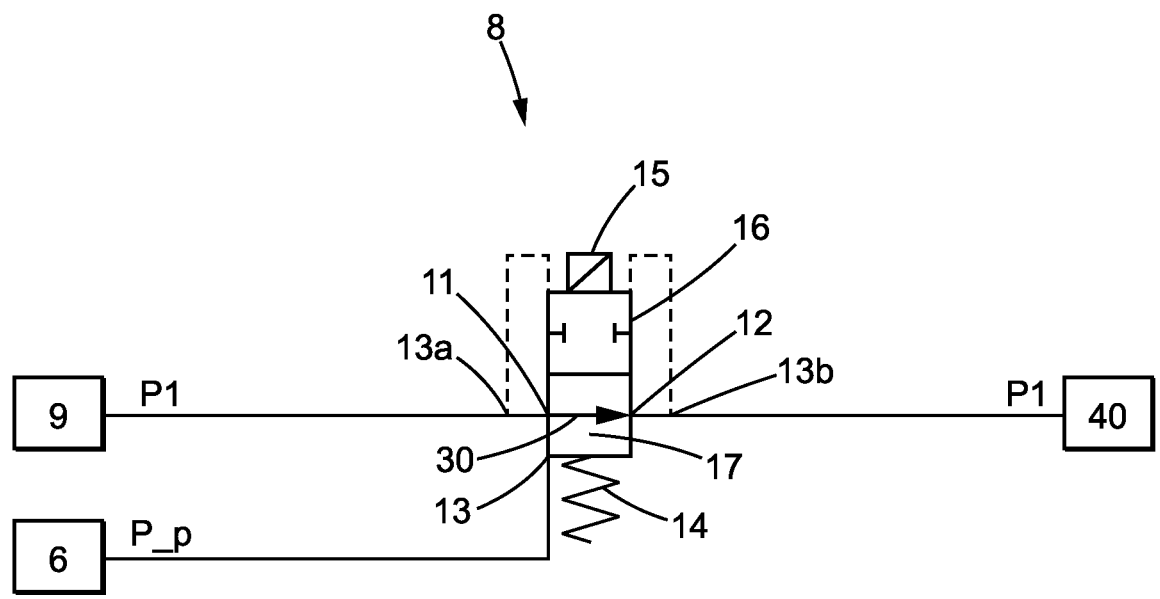
FIG. 3 is a schematic view of the first embodiment of the isolation device, in a different operating mode.

FIGS. 2 and 3 are a schematic representation of a first embodiment. According to this first embodiment of the pneumatic braking system 100, the isolation device 8 comprises an on-off solenoid valve 17, the on-off solenoid valve 17 comprises:
 a.—an inlet port 11,
 b.—an outlet port 12,
 c—a control port 13,
 d—a return spring 14,
 e—an electromagnet 15,
 f—a plunger 16, configured for moving under the joined action of the electromagnet, of the return spring 14 and of a pressure in the control port 13, to selectively allow or prevent fluidic communication between the inlet port 11 and the outlet port 13,
 the plunger 16 being configured for:
  i. allowing fluidic communication between the inlet port 11 and the outlet port 12 when the electromagnet 15 is not electrically energized and the pressure in the control port 13 is higher than the first predetermined threshold Th_1, and
  ii. preventing fluidic communication between inlet port 11 and outlet port 12:
   1. when the electromagnet 15 is electrically energized or
   2. when the electromagnet 15 is not electrically energized and the pressure in the inlet port 11 is higher than a second predetermined threshold Th_2 and the pressure in the control port 13 is lower than a third predetermined threshold Th_3,
  in which the first air control pressure P1 is fluidically connected to the inlet port 11 of the on-off solenoid valve, in which the outlet port 12 of the on-off solenoid valve is fluidically connected to the regulation unit 40, and in which the control port 13 is fluidically connected to the parking brake pneumatic chamber 6.

Throughout the description, the expression "is fluidically connected to" means "in permanent fluidic communication with".

The on-off solenoid valve 17 comprises an inlet port 11, an outlet port 12, a control port 13, a return spring 14, an electromagnet 15, a first internal control port 13a, and a second internal control port 13b. The plunger 16 can slide in a housing between a first extreme position and a second extreme position. In the first extreme position, FIG. 2, the plunger 16 prevents fluidic communication between inlet port 11 and outlet port 12. Both inlet port 11 and outlet 12 are sealed, because they are facing a wall of the plunger 16. In the second extreme position, FIG. 3, the plunger 16 allows fluidic communication between the inlet port 11 and the outlet port 12, because both inlet port 11 and outlet port 12 are facing an internal duct 30 of the plunger. Only the first extreme position and the second extreme position are steady state positions. Intermediate positions between the first extreme position and the second extreme position are only transient positions that the plunger 16 can go through during the transitions between the first and the second extreme positions.

First internal control port 13a in in permanent fluidic communication with inlet port 11. Therefore, pressure in the first internal control port 13a is equal to P1 pressure. Second internal control port 13b is in permanent fluidic communication with the outlet port 12. Outlet port 12 is fluidically connected to regulation unit 40.

Plunger 16 can slide in the housing under the combined forces applied on it by the electromagnet 15, by the return spring 14, by the pressure in the control port 13, by the pressure in the first internal control port 13a, and by the pressure in the second external control port 13b.

Return spring 14 and pressure in the control port 13 both tend to push the plunger 16 in a first direction, towards second extreme position. The electromagnet 15, the pressure in the first internal control port 13a, and the pressure in the second external control port 13b all tend to push the plunger 16 in the opposite direction, towards the first extreme position.

The magnetic properties of the electromagnet 15, the mechanical properties of the return spring 14 and the surface area acting of the plunger 16 are chosen so that when the electromagnet 15 is energized, the force applied by the electromagnet 15 is always higher that the combined forces applied by the return spring 14 and the various pressure in the different control ports 13, 13a, 13b.

Therefore, when the electromagnet 15 is energized, it pushes the plunger 16 so that the plunger 16 is in the first extreme position, which is the position represented on FIG. 2.

When the electromagnet 15 is not energized, the position of the plunger 16 is the result of the balance of the forces of return spring 14, the pressure in the control port 13, and the pressure in the two internal control ports 13a, 13b.

When the pressure in the inlet port 11 is high enough, ie higher than a second predetermined threshold Th_2 and at the same time the pressure in the control port 13 is low enough, i.e lower than a third predetermined threshold Th_3, the plunger 16 is pushed in the first extreme position as on FIG. 2, in which the inlet port 11 and outlet port 12 are blanked-off. This means that service brakes can't be applied when parking brakes are applied. Anti-compounding function is provided.

Still when the electromagnet 15 is not electrically energized, when pressure in the control port 13 is high enough, i.e higher than the first predetermined threshold Th_1, the plunger 16 is pushed in the second extreme position, as on FIG. 3. In this position of the plunger 16, fluidic communication between the inlet port 11 and the outlet port 12 is allowed. This means that when parking brake is released, P1 control pressure is transmitted to the regulation unit 40 so that service brakes are applied.

Figure 4:
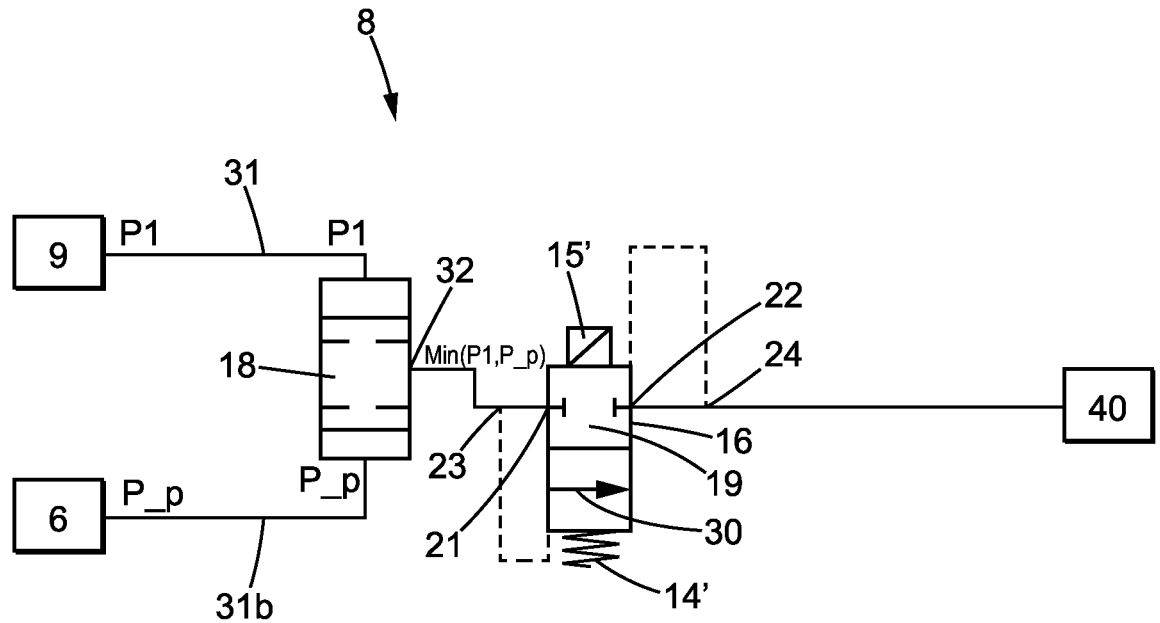
FIG. 4 is a schematic view of a second embodiment of the isolation device, in a first operating mode.
Figure 5:
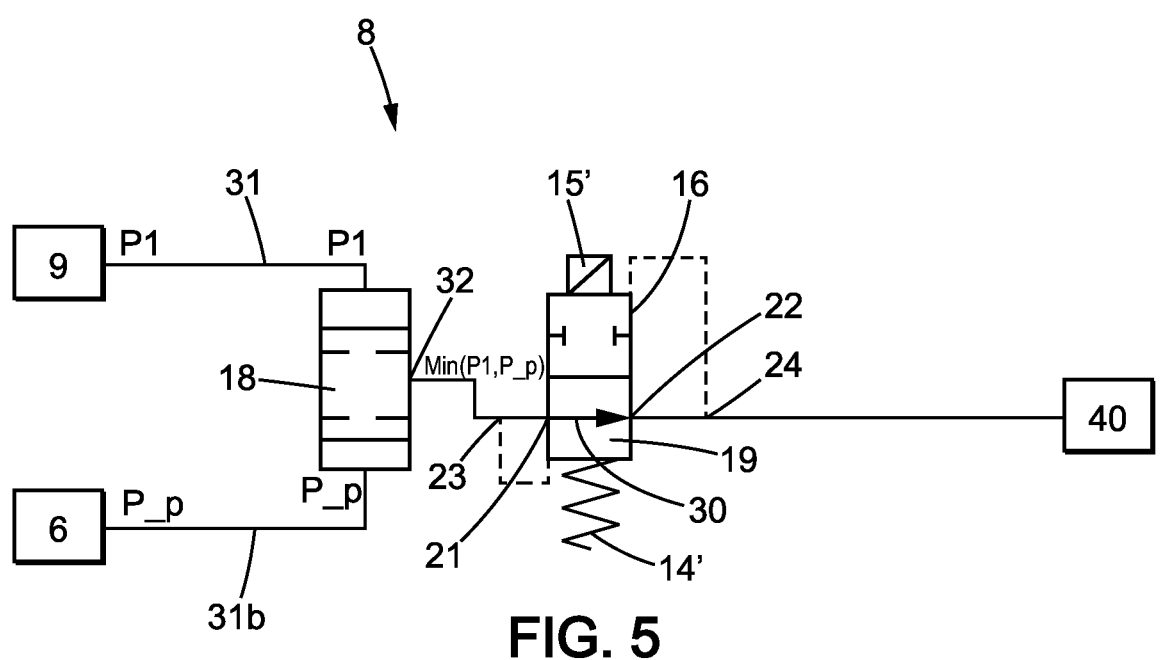
FIG. 5 is a schematic view of the second embodiment of the isolation device, in a different operating mode.

FIGS. 4 and 5 are a schematic representation of a second embodiment. In this embodiment, the isolation device 8 comprises a select low valve 18 and an electromagnetic isolation valve 19,
   a. the electromagnetic isolation valve 19 comprising an inlet port 21 and an outlet port 22, and being configured for allowing fluidic communication between the inlet port 21 and the outlet port 22 when the electromagnetic isolation valve 19 is not electrically energized and for preventing fluidic communication between the inlet port 21 and the outlet port 22 when the electromagnetic isolation valve is electrically energized,
   b. the select low valve 18 comprising a first inlet port 31 connected to the first air control pressure P1, a second inlet port 31b connected to the parking brake pneumatic chamber 6 having a second air pressure P_p, and an outlet ports 32,
   the select low valve 18 being configured so that an outlet port 32 pressure is equal to the lowest of the first pressure P1 and second air pressure P_p,
   the outlet port 32 of the select low valve 18 is connected to the inlet port 21 of the electromagnetic isolation valve 19,
   and the outlet port 22 of the electromagnetic isolation valve 19 is configured for being in fluidic communication with the regulation unit 40.

The select low valve 18 is upstream from the isolation valve 19. The select low valve 18 and the isolation valve 19 are in this embodiment separated components. Each component has its own housing.

The select low valve 18 has two inlet ports 31, 31b and one outlet port 32. The first inlet port 31 permanently receives the first air control pressure P1. The second inlet port 31b permanently receives the second air pressure P_p, i.e the parking brake chamber 6 pressure. An internal plunger can slide an housing of the select low valve 18, under the opposite effects of the pressure in the first internal port 31 and the pressure in the second internal port 31b. Resulting outlet pressure in port 32 is the lowest of the two pressures P1, P_p.

The electromagnetic isolation valve 19 comprises an inlet port 21, an outlet port 22, a return spring 14, an electromagnet 15, a first internal control port 23, and a second internal control port 24. The plunger 16 can slide in a housing between a first extreme position and a second extreme position. In the first extreme position, FIG. 4, the plunger 16 prevents fluidic communication between inlet port 21 and outlet port 22 because both inlet port 21 and outlet 22 are sealed, because they are facing a wall of the plunger 16. In the second extreme position, FIG. 5, the plunger 16 allows fluidic communication between the inlet port 21 and the outlet port 22, because both inlet port 21 and outlet port 22 are facing an internal duct 30 of the plunger. Only the first extreme position and the second extreme position are steady state positions. Intermediate position between the first extreme position and the second extreme position are only transient positions that the plunger can take during the transitions between first and second extreme positions.

As schematically represented on FIGS. 4 and 5, the first internal control port 23 is in permanent fluidic communication with the inlet port 21. Therefore, pressure in the first internal control port 23 is equal to the pressure at the outlet of the select low valve 18, therefore the minimum between P1 and P_p. Second internal control port 24 is in permanent fluidic communication with outlet port 22. Outlet port 22 connected to regulation unit 40.

Plunger 16 can slide in the housing under the combined forces applied by the electromagnet 15, the return spring 14, the pressure in the first internal control port 23, and the pressure in the second external control port 24.

Return spring 14 and pressure in the first internal control port 23 both tend to push the plunger 16 in a first direction, towards first extreme position. The electromagnet 15, and the pressure in the second internal control port 24 both tend to push the plunger 16 in the opposite direction, towards second extreme position.

The magnetic properties of the electromagnet 15, the mechanical properties of the return spring 14 and the surfaces acting of the plunger 16 are chosen so that when the electromagnet 15 is energized, the force applied by the electromagnet 15 is always higher that the combined forces applied by the return spring 14 and the various pressure in the internal control ports 23 and 24.

Therefore, when the electromagnet 15 is energized, it pushes the plunger 16 so that the plunger is in the first extreme position and pressure delivery to regulation unit 40 is prevented. This mode is represented on FIG. 4.

When the electromagnet 15 is not energized, the position of the plunger 16 is the result of the balance of the forces of return spring 14, the pressure in the first internal control port 23, and the pressure in the second internal control port 24.

When the electromagnet 15 is not active and parking brake is applied, pressure P_p in parking brake chamber 6 is close to atmospheric pressure. Therefore, when braking brakes are applied, P1 is not transmitted since the output of the select low valve 18 will be P_p, which is lower than P1. In turn, pressure of the internal control port 23 is close to atmospheric pressure. Without the effect of internal port pressure to lift the plunger 16, the plunger remains in the position in which outlet port 22 is isolated from inlet port 21, as represented on FIG. 4. P1 pressure is not transmitted to the regulation unit 40, therefore anti-compounding function is provided.

When electromagnet 15 is not active and parking brake is released, pressure P_p in parking brake chamber 6 is close to 8 bar, which is higher than P1 pressure. Therefore, when driver requires brakes application, the output pressure of the select low valve is P1 pressure. The internal control port 23 receives P1 pressure and moves the plunger 16 in the second extreme position in which outlet port 22 communicates with inlet port 21, as represented on FIG. 5. In this case, P1 pressure is transmitted to regulation unit 40, therefore service brakes are applied as expected. Vehicle braking is provided by the pneumatic back-up line.

Figure 6:
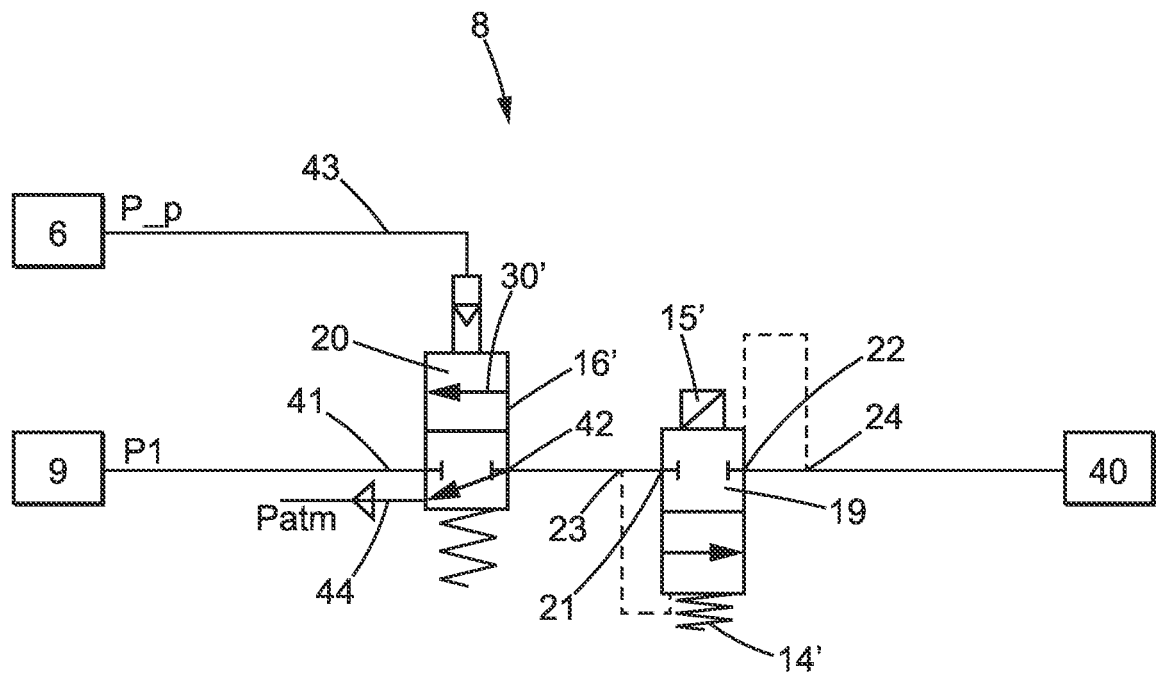
FIG. 6 is a schematic view of a third embodiment of the isolation device, in a first operating mode.
Figure 7:
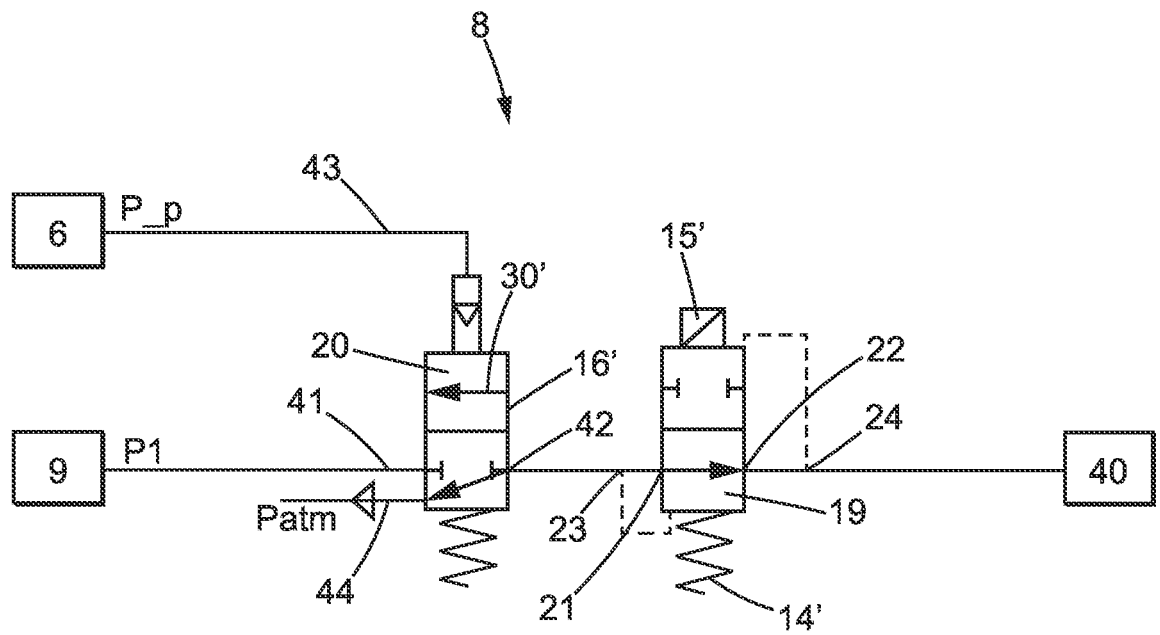
FIG. 7 is a schematic view of the third embodiment of the isolation device, in a different operating mode.
Figure 8:
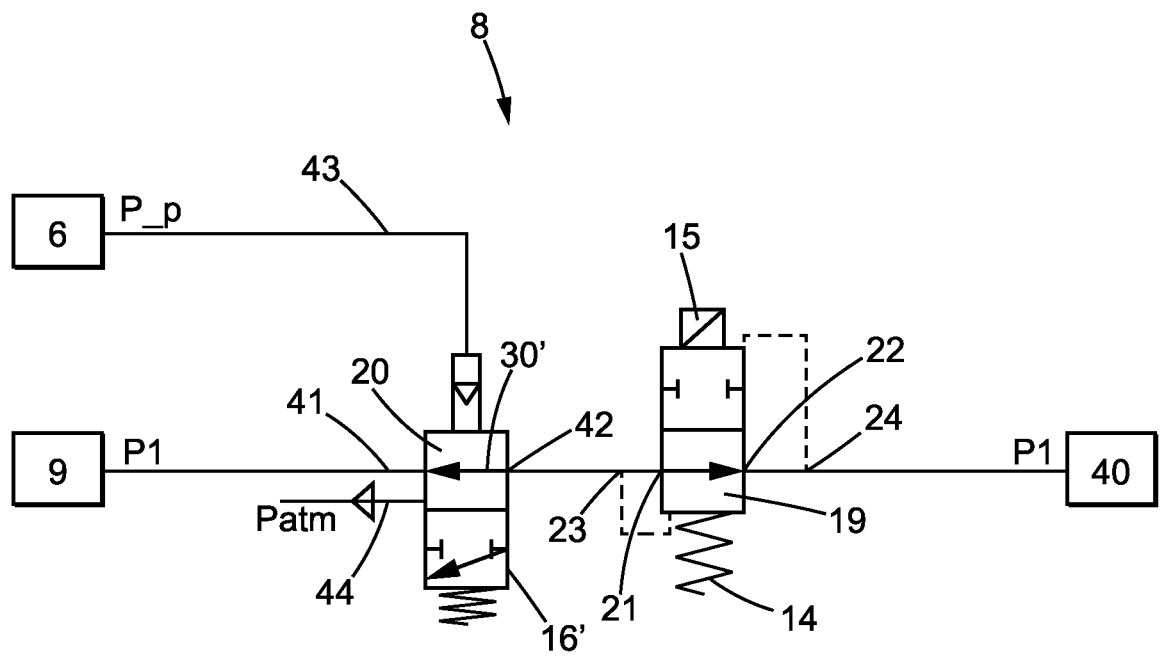
FIG. 8 is a schematic view of the third embodiment of the isolation device, in a second different operating mode.

FIGS. 6, 7 and 8 are a schematic representation of a third embodiment. According to this third embodiment of the pneumatic braking system, the isolation device 8 comprises a pneumatic isolation valve 20 and an electromagnetic isolation valve 19,
  a. the pneumatic isolation valve 20 comprising a control port 43, an inlet port 41, an outlet port 42, the first air control pressure P1 being fluidically connected to the inlet port 11, the control port 43 being fluidically connected to the parking brake pneumatic chamber 6, the pneumatic isolation valve 20 being configured for:
    i. allowing fluidic communication between the inlet port 41 and the outlet port 42 if pressure in the control port 43 is higher than the first predetermined threshold Th_1, and
    ii. preventing fluidic communication between the inlet port 41 and the outlet port 42 if pressure in the control port 43 is lower than or equal to the first predetermined threshold Th_1, and
    iii. allowing fluidic communication between the outlet port 42 and atmosphere if pressure in the control port 43 is lower than or equal to the first predetermined threshold Th_1,
  b. the electromagnetic isolation valve 19 comprising an inlet port 21 and an outlet port 22, and being configured for:
    i. allowing fluidic communication between the inlet port 21 and the outlet port 22 when the electromagnetic isolation valve 19 is not electrically energized and,
    ii. preventing fluidic communication between inlet port 21 and outlet port 22 when the electromagnetic isolation valve 19 is electrically energized,
  in which the outlet port 42 of the pneumatic isolation valve 20 is connected to the inlet port 21 of the electromagnetic isolation valve 19, and
  in which the outlet port 22 of the electromagnetic isolation valve 19 is configured for being in fluidic communication with the regulation unit 40.

In this third embodiment, the electromagnetic isolation valve 19 operates in the same way as the second embodiment and will not be described again. The pneumatic isolation valve 20 is upstream from the electromagnetic isolation valve 19.

The pneumatic isolation valve 20 comprises an inlet port 41, an outlet port 42, a return spring 14, an internal control port 43, an auxiliary port 44 and a mobile plunger 16'. The plunger 16' can slide in a housing between a first extreme position and a second extreme position. In the second extreme position, represented on FIG. 8, the plunger 16 allows fluidic communication between inlet port 41 and outlet port 42 because both inlet port 41 and outlet port 42 are aligned with an internal duct 30' of the plunger 16'. In the first extreme position, represented on FIGS. 6 and 7, the plunger 16' prevents fluidic communication between the inlet port 41 and the outlet port 42. Outlet port 42 is in communication with auxiliary port 44 which is connected to the atmospheric pressure Patm. Inlet port 41 is facing an internal duct of the plunger 16' and is sealed. Plunger 16' can slide in its housing under combined actions of return spring and of the pressure applied in the control port 43. Return spring and pressure in the control port 43 have opposite effects. Control port 43 receives pressure P_p from the parking brake chamber 6.

When the pressure in the control port 43 is high enough, i.e higher than a threshold, the action of this pressure on a surface of the plunger overcomes the force exerced by the return spring and the plunger can move to the position in which inlet port 41 and outlet port 42 are in fluidic communication. Therefore, air control pressure P1 is transmitted to the electromagnetic isolation valve 19, as represented on FIG. 8.

When the pressure in the control port 43 is low, i.e lower than the threshold, the action of the return springs overcomes the effect of the pressure acting of the plunger. The plunger thus remains in the first extreme position in which the inlet port 41 is isolated, and outlet port 42 is in communication with atmosphere, through auxiliary port 44. This is the position of FIG. 6 and FIG. 7.

When the pressure P_p in the control port 43 is high enough, i.e higher than a threshold, plunger 16' is pushed in the second extreme position, FIG. 8. Control pressure P1 is transmitted to the inlet port 21 of the electromagnetic isolation valve 19.

When the electromagnet 15 of the isolation valve 19 is energized, it pushes the plunger 16 so that the plunger is in the first extreme position and pressure delivery to regulation unit 40 is prevented. This mode is represented on FIG. 6.

When the electromagnet 15 of the isolation valve 19 is not energized, the plunger 16 is pushed towards the second extreme position, FIG. 8, and the first control pressure P1 is transmitted to the regulation unit 40.

In other words, when the parking brake is released, air control pressure P1 from back-up line is transmitted to the regulation unit 40, and service brakes are applied. Conversely, when the parking brake is activated, air control pressure P1 from back-up line is not transmitted to regulation unit 40. Furthermore, service brakes chambers 3 are depressurized, since inlet port of regulation unit 40 is in communication with atmospheric pressure Patm through the outlet port 42 and auxiliary port 44, as represented on FIG. 7.

Isolation device 8 can be disposed in the layout of the pneumatic braking system 100 in different locations, while still operating in the same way.

According to the embodiment of FIG. 1, the isolation device 8 is included in the electro pneumatic modulator unit 2. It should be understood that the isolation device 8 and the electro pneumatic modulator unit 2 are in such a case contained in a common housing.

According to another embodiment, not represented on the figures, the isolation device 8 is included in a foot brake modulator 9, the foot brake modulator 9 being configured for delivering the first air control pressure P1 and being a separated unit from the electro pneumatic modulator unit 2. The operation remains identical, only the mechanical integration of the isolation device 8 is different.

According to yet another embodiment, schematically represented on FIG. 10, the isolation device 8 is separated from electro pneumatic modulator unit 2 and separated from the foot brake modulator 9. As the previous embodiment, the operation of the isolation device remains identical and only its mechanical integration in the vehicle differs. The isolation device 8 is disposed upstream from the electro pneumatic modulator unit 2. Outlet port of the isolation device 8 is in fluidic communication with one inlet port of electro pneumatic modulator unit 2.

In the example here described, the parking brake chamber 6 pressure first threshold Th_1 for allowing or preventing the delivery of the first air control pressure P1 to the regulation unit 40 is comprised between 3.5 Bar and 4.5 Bar. The second predetermined threshold Th_2 is comprised between 3 and 4 Bar, and the third predetermined threshold Th_3 is comprised between 2 and 2.8 Bar. These values allow to obtain proper anti-compounding function and proper service brake application.

According of one example of implementation of the pneumatic braking system, as schematically represented on FIG. 1, the parking brake unit 7 comprises an electronic control unit configured for delivering the second modulated air pressure P_p to the parking brake pneumatic chamber 6.

Figure 11:
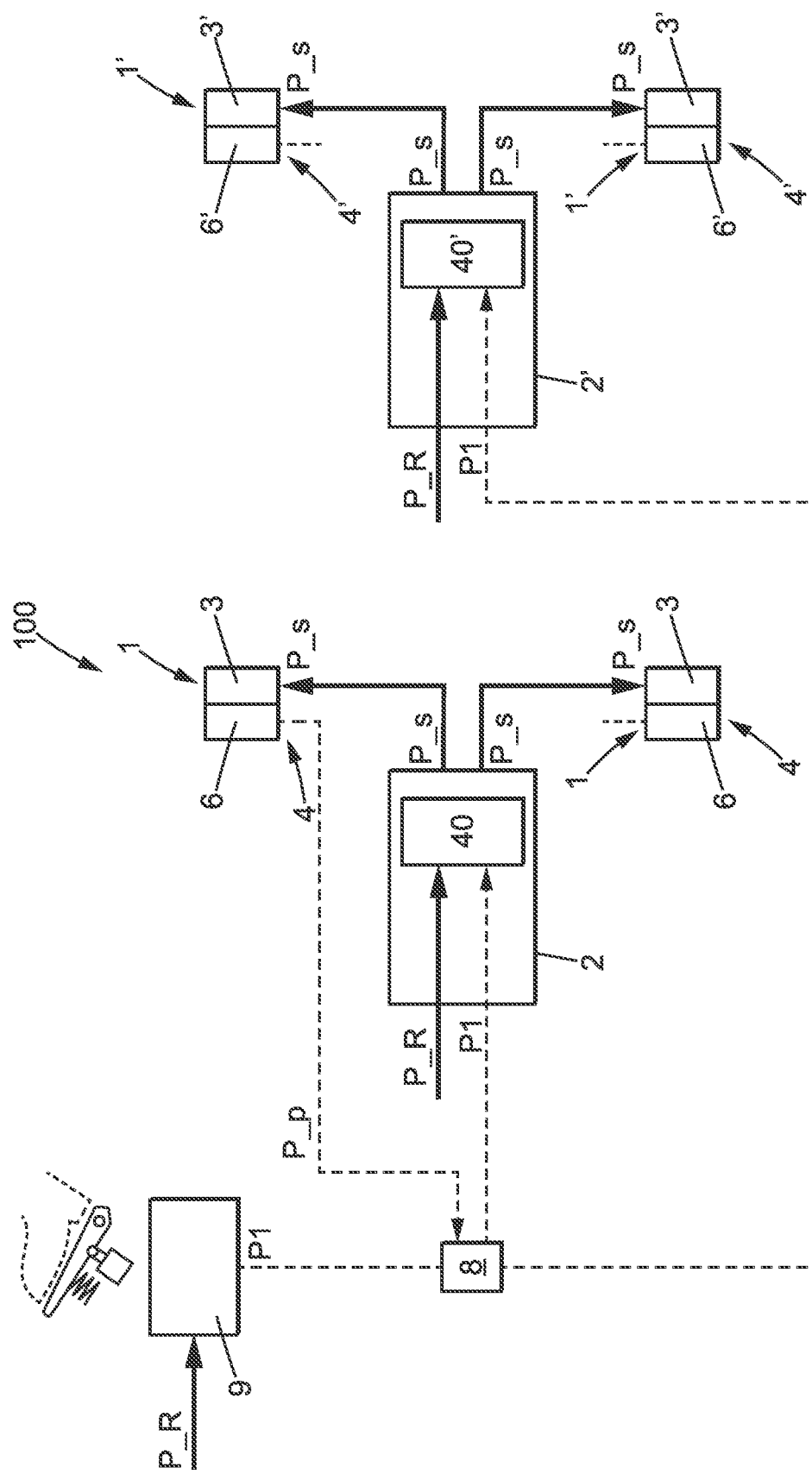
FIG. 11 is a schematic view of another embodiment of the pneumatic braking system.

FIG. 11 illustrates another embodiment, with a pneumatic braking system compatible with two separate axles.

According the example of implementation represented on FIG. 11, the pneumatic braking system 100 further comprises:
- a.—a second service brake actuator 1' configured for applying a braking force to a second axle of the vehicle,
- b.—a second electro pneumatic modulator unit 2' configured for:
  - i. Receiving the first air control pressure P1 representative of a vehicle driver's braking request,
  - ii. Receiving the air supply pressure P_R, and
  - iii. Delivering a second modulated air pressure P_s' to a second service brake chamber 3' to control the braking force applied by the second service brake actuator 1', the second modulated air pressure P_s' being delivered by a second regulation unit 40',
in which the isolation device 8 is further configured for:
  - in a first mode in which the isolation device 8 is electrically energized, preventing the delivery of the first air control pressure P1 to the second regulation unit 40',
  - in a second mode in which the isolation device 8 is not electrically energized:
    - allowing the delivery of the first air control pressure P1 to the second regulation unit 40' when the pressure in the parking brake chamber 6 is higher than a first predetermined threshold Th_1, and
    - preventing the delivery of the first air control pressure P1 to the second regulation unit 40' when the pressure in the parking brake chamber 6 is lower than or equal to the first predetermined threshold Th_1.

In other words, the same isolation device 8 can control the delivery and the prevention of the delivery of the first air control pressure P1 to both the first regulation unit 40 and the second regulation unit 40'. A single isolation device 8 can be used for both axles, which simplifies the braking system.

As the parking brake of the different axles are operated together, i.e they are activated simultaneously or deactivated simultaneously, isolation unit 8 can be connected either to the parking brake chamber 6 of the first axle or to the parking brake chamber 6' of the second axle. On FIG. 11 and as described above, isolation unit 8 is connected to the parking brake chamber 6 of the first axle. To simplify FIG. 11, parking brake supply lines have not been represented.

According to a variant of the previous embodiment, not represented, the isolation device 8 is included in the electro pneumatic modulator unit 2.

Figure 12:
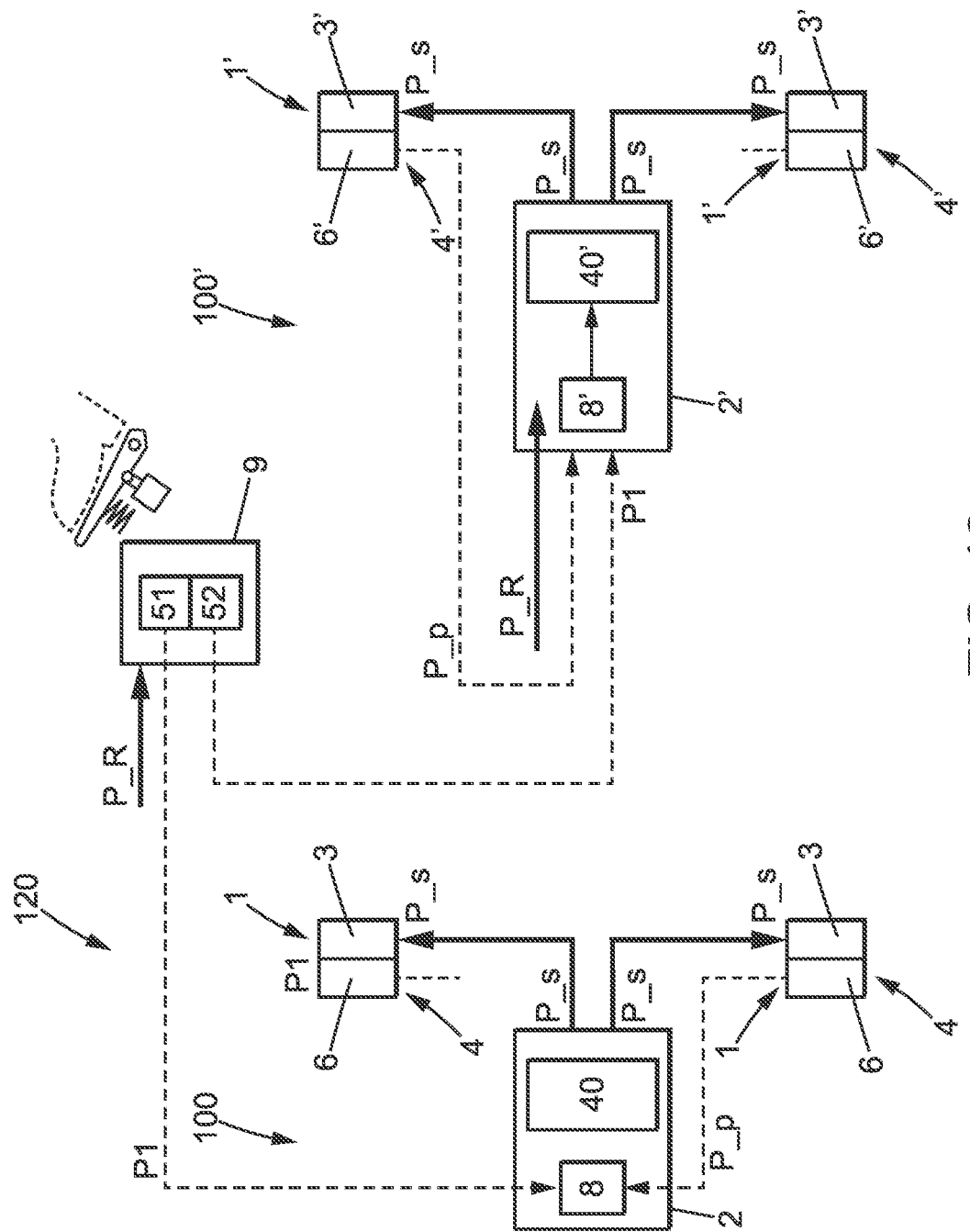
FIG. 12 is a schematic view of another embodiment of the pneumatic braking system.

FIG. 12 represents another embodiment compatible with three separate axles.

A braking assembly system 120 is represented on FIG. 12. In this embodiment, the so called 'first pneumatic braking system' is the pneumatic braking system as described above.

The braking system assembly 120 comprises:
- a. a first pneumatic braking system 100 as described above, the first pneumatic braking system 100 cooperating with a first axle of the vehicle, and comprising
- b. a second pneumatic braking system 100' as described above, the second pneumatic braking system 100 cooperating with a second axle of the vehicle,
the first pneumatic braking system comprising a foot brake modulator 9 comprising two stages 51 and 52, the first stage 51 being configured to deliver a first air control pressure P1 representative of a vehicle driver's braking request to the isolation device 8 of the first pneumatic braking system, and
the second stage 52 being configured to deliver the first air control pressure P1 representative of a vehicle driver's braking request to the isolation device 8' of the second pneumatic braking system 100'.

The first pneumatic braking system 100 mentioned above is a pneumatic braking system as described earlier in the specification. Similarly, the second pneumatic braking system 100' is a pneumatic braking system as described earlier in the specification.

Figure 13:
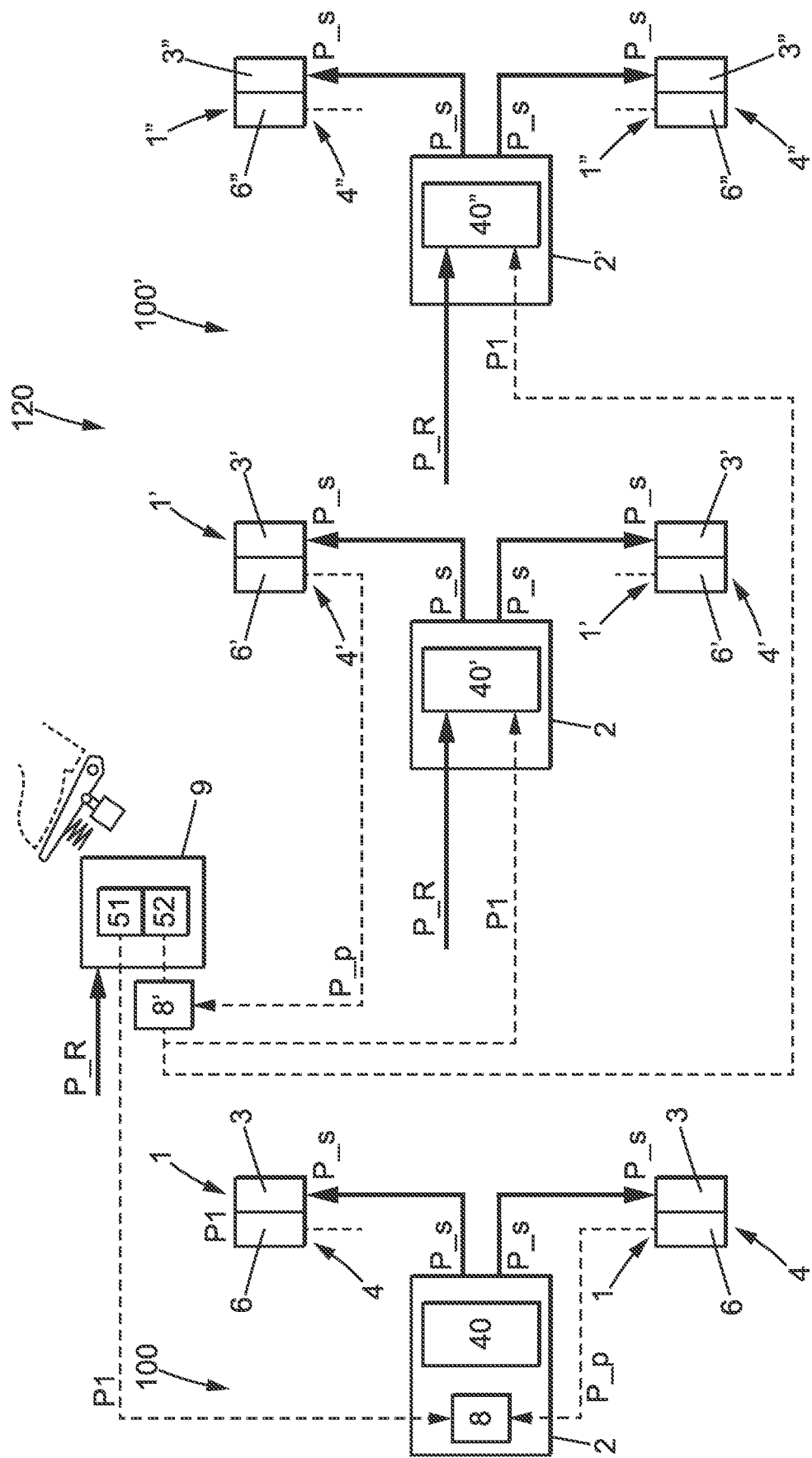
FIG. 13 is a schematic view of yet another embodiment of the pneumatic braking system.

In a variant, illustrated on FIG. 13, second pneumatic braking system 100' deals with two axles. Each axle is equipped in a similar way; with respectively isolation device 40', 40", service brake actuator 1', 1", parking brake 4', 4", service brake chamber 3', 3", parking brake chamber 6', 6".

The second stage 52 of the foot brake modulator 9 delivers the first air control pressure P1 representative of a vehicle driver's braking request to the isolation device 8'. The isolation device 8' cooperates with both isolation device 40' and isolation device 40".

The invention claimed is:
1. A pneumatic braking system for an axle of a vehicle, comprising:
   a service brake actuator configured to apply a braking force to the axle of the vehicle,
   a parking brake actuator, configured to apply a braking force under the action of an elastic spring and a pneumatic chamber, the pneumatic chamber being configured to apply a force opposed to the force applied by the spring,
   an electro pneumatic modulator unit configured to:
     receive a first air control pressure representative of a braking request,
     receive an air supply pressure, and
     deliver a first modulated air pressure to a service brake chamber to control the braking force applied, the first modulated air pressure being delivered by a regulation unit, the total braking force being a sum of a service brake actuator force and a parking brake actuator force,
   a parking brake unit, configured to deliver a second air pressure to the parking brake pneumatic chamber to control the braking force applied by the parking brake actuator, and
   an isolation device configured to:
     in a first mode in which the isolation device is electrically energized, prevent the delivery of the first air control pressure to the regulation unit, and in a second mode in which the isolation device is not electrically energized:
allow the delivery of the first air control pressure to the regulation unit so that a braking force is applied by the service brake actuator when the pressure in the parking brake chamber is higher than a first predetermined threshold, and
prevent the delivery of the first air control pressure to the regulation unit when the pressure in the parking brake chamber is lower than or equal to the first predetermined threshold.

2. The pneumatic braking system of claim 1, in which the isolation device comprises an on-off solenoid valve, the on-off solenoid valve comprising:
an inlet port,
an outlet port,
a control port,
a return spring,
an electromagnet, and
a plunger, configured to move under the joined action of the electromagnet, the return spring, and a pressure in the control port, to selectively allow or prevent fluidic communication between the inlet port and the outlet port, the plunger being configured to:
allow fluidic communication between the inlet port and the outlet port when the electromagnet is not electrically energized and the pressure in the control port is higher than the first predetermined threshold, and
prevent fluidic communication between inlet port and outlet port:
when the electromagnet is electrically energized, or
when the electromagnet is not electrically energized and the pressure in the inlet port is higher than a second predetermined threshold and the pressure in the control port is lower than a third predetermined threshold,
wherein the first air control pressure is fluidically connected to the inlet port of the on-off solenoid valve, in which the outlet port of the on-off solenoid valve is fluidically connected to the regulation unit, and in which the control port is fluidically connected to the parking brake pneumatic chamber.

3. The pneumatic braking system of claim 1, in which the isolation device comprises a select low valve and an electromagnetic isolation valve,
the electromagnetic isolation valve comprising an inlet port and an outlet port, and being configured for allowing fluidic communication between the inlet port and the outlet port when the electromagnetic isolation valve is not electrically energized and for preventing fluidic communication between the inlet port and the outlet port when the electromagnetic isolation valve is electrically energized,
the select low valve comprising a first inlet port connected to the first air control pressure, a second inlet port connected to the parking brake pneumatic chamber having a second air pressure, and an outlet port, and
the select low valve being configured so that an outlet port pressure is equal to the lowest of the first air pressure and the second air pressure,
wherein the outlet port of the select low valve is connected to the inlet port of the electromagnetic isolation valve, and
wherein the outlet port of the electromagnetic isolation valve is configured for being in fluidic communication with the regulation unit.

4. The pneumatic braking system of claim 1, in which the isolation device comprises a pneumatic isolation valve and an electromagnetic isolation valve,
the pneumatic isolation valve comprises a control port, an inlet port, and an outlet port, the first air control pressure being fluidically connected to the inlet port, the control port being fluidically connected to the parking brake pneumatic chamber,
the pneumatic isolation valve configured to:
allow fluidic communication between the inlet port and the outlet port if pressure in the control port is higher than the first predetermined threshold,
prevent fluidic communication between the inlet port and the outlet port if pressure in the control port is lower than or equal to the first predetermined threshold, and
allow fluidic communication between the outlet port and atmosphere if pressure in the control port is lower than or equal to the first predetermined threshold, and
the electromagnetic isolation valve comprising an inlet port and an outlet port, and is configured to:
allow fluidic communication between the inlet port and the outlet port when the electromagnetic isolation valve is not electrically energized, and
prevent fluidic communication between inlet port and outlet port when the electromagnetic isolation valve is electrically energized,
wherein the outlet port of the pneumatic isolation valve is connected to the inlet port of the electromagnetic isolation valve, and
wherein the outlet port of the electromagnetic isolation valve is configured for being in fluidic communication with the regulation unit.

5. The pneumatic braking system of claim 1, in which the isolation device is included in the electro pneumatic modulator unit.

6. The pneumatic braking of claim 1, in which the isolation device is included in a foot brake modulator, the foot brake modulator being configured to deliver the first air control pressure and being a separate unit from the electro pneumatic modulator unit.

7. The pneumatic braking system of claim 6, in which the isolation device is separate from the electro pneumatic modulator unit and separate from the foot brake modulator.

8. The pneumatic braking system of claim 1, in which the first predetermined parking brake chamber pressure threshold for allowing or preventing the delivery of the first air control pressure to the regulation unit is between 3.5 Bar and 4.5 Bar.

9. The pneumatic braking system of claim 2, in which the second predetermined threshold is comprised between 3 and 4 Bar, and the third predetermined threshold is comprised between 2 and 2.8 Bar.

10. The pneumatic braking system of claim 3, in which the parking brake unit comprises an electronic control unit configured for delivering the second modulated air pressure to the parking brake pneumatic chamber.

11. The pneumatic braking system of claim 1, further comprising:
a second service brake actuator configured to apply a braking force to a second axle of the vehicle, and
a second electro pneumatic modulator unit configured to:
receive the first air control pressure representative of a braking request,
receive the air supply pressure, and deliver a second modulated air pressure to a second service brake chamber to control the braking force applied by the second service brake actuator, the second modulated air pressure being delivered by a second regulation unit, wherein the isolation device is further configured to:
in a first mode in which the isolation device is electrically energized, prevent the delivery of the first air control pressure to the second regulation unit, and
in a second mode in which the isolation device is not electrically energized:
allow the delivery of the first air control pressure to the second regulation unit when the pressure in the parking brake chamber is higher than the first predetermined threshold, and
prevent the delivery of the first air control pressure to the second regulation unit when the pressure in the parking brake chamber is lower than or equal to the first predetermined threshold.

12. The pneumatic braking system of claim 11, in which the isolation device is included in the electro pneumatic modulator unit.

13. A braking system assembly, comprising:
a first pneumatic braking system comprising:
a service brake actuator configured to apply a braking force to the axle of the vehicle,
a parking brake actuator, configured to apply a braking force under the action of an elastic spring and a pneumatic chamber, the pneumatic chamber being configured to apply a force opposed to the force applied by the spring,
an electro pneumatic modulator unit configured to:
receive a first air control pressure representative of a braking request,
receive an air supply pressure, and
deliver a first modulated air pressure to a service brake chamber to control the braking force applied, the first modulated air pressure being delivered by a regulation unit, the total braking force being a sum of a service brake actuator force and a parking brake actuator force,
a parking brake unit, configured to deliver a second air pressure to the parking brake pneumatic chamber to control the braking force applied by the parking brake actuator, and
an isolation device configured to:
in a first mode in which the isolation device is electrically energized, prevent the delivery of the first air control pressure to the regulation unit, and
in a second mode in which the isolation device is not electrically energized:
allow the delivery of the first air control pressure to the regulation unit so that a braking force is applied by the service brake actuator when the pressure in the parking brake chamber is higher than a first predetermined threshold, and
prevent the delivery of the first air control pressure to the regulation unit when the pressure in the parking brake chamber is lower than or equal to the first predetermined threshold;
wherein the first pneumatic braking system cooperates with a first axle of the vehicle;
a second pneumatic braking system, the second pneumatic braking system cooperating with a second axle of the vehicle,
wherein the first pneumatic braking system comprises a foot brake modulator comprising two stages, the first stage being configured to deliver a first air control pressure representative of a braking request to the isolation device of the first pneumatic braking system, and
wherein the second stage is configured to deliver the first air control pressure representative of a braking request to the to the isolation device of the second pneumatic braking system.

14. A commercial vehicle comprising a pneumatic braking system comprising:
a service brake actuator configured to apply a braking force to the axle of the vehicle,
a parking brake actuator, configured to apply a braking force under the action of an elastic spring and a pneumatic chamber, the pneumatic chamber being configured to apply a force opposed to the force applied by the spring,
an electro pneumatic modulator unit configured to:
receive a first air control pressure representative of a braking request,
receive an air supply pressure, and
deliver a first modulated air pressure to a service brake chamber to control the braking force applied, the first modulated air pressure being delivered by a regulation unit, the total braking force being a sum of a service brake actuator force and a parking brake actuator force,
a parking brake unit, configured to deliver a second air pressure to the parking brake pneumatic chamber to control the braking force applied by the parking brake actuator, and
an isolation device configured to:
in a first mode in which the isolation device is electrically energized, prevent the delivery of the first air control pressure to the regulation unit, and
in a second mode in which the isolation device is not electrically energized:
allow the delivery of the first air control pressure to the regulation unit so that a braking force is applied by the service brake actuator when the pressure in the parking brake chamber is higher than a first predetermined threshold, and
prevent the delivery of the first air control pressure to the regulation unit when the pressure in the parking brake chamber is lower than or equal to the first predetermined threshold.

* * * * *